United States Patent
Chang

(10) Patent No.: US 12,160,776 B2
(45) Date of Patent: *Dec. 3, 2024

(54) RAN-ASSISTED RATE ADAPTATION

(71) Applicant: Kyocera Corporation, Kyoto (JP)

(72) Inventor: Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,451

(22) Filed: Jul. 5, 2023

(65) Prior Publication Data

US 2023/0354104 A1 Nov. 2, 2023

Related U.S. Application Data

(63) Continuation of application No. 17/545,734, filed on Dec. 8, 2021, now Pat. No. 11,736,983, which is a continuation of application No. 16/319,761, filed as application No. PCT/US2017/046020 on Aug. 9, 2017, now Pat. No. 11,252,612.

(Continued)

(51) Int. Cl.
*H04W 4/00* (2018.01)
*H04L 65/10* (2022.01)
*H04L 65/1069* (2022.01)
*H04L 65/1106* (2022.01)
(Continued)

(52) U.S. Cl.
CPC ............ *H04W 28/22* (2013.01); *H04L 65/10* (2013.01); *H04L 65/1069* (2013.01); *H04L 65/1106* (2022.05); *H04L 69/24* (2013.01)

(58) Field of Classification Search
CPC ..... H04W 28/22; H04W 28/04; H04W 72/04; H04W 72/042; H04W 88/08; H04W 28/08; H04W 28/084; H04W 36/22; H04W 72/12; H04L 65/10; H04L 65/1069; H04L 65/1106; H04L 69/24; H04L 5/0007
See application file for complete search history.

(56) References Cited

U.S. PATENT DOCUMENTS 8,520,643 B2    8/2013   Lee et al.
8,625,608 B2    1/2014   Wanstedt et al.
(Continued)

FOREIGN PATENT DOCUMENTS

WO    2015/129181 A1    9/2015
WO    2016/064637 A1    4/2016

OTHER PUBLICATIONS

Huawei, Hisilicon; "RAN based codec adaptation solution", R2-164264; 3GPP TSG-RAN WG2 Meeting #92, May 23-27, 2016; Nanjing, CN.

(Continued)

*Primary Examiner* — Phuongchau Ba Nguyen

(57) ABSTRACT

A base station transmits a rate recommendation to a first user equipment (UE) device. The rate recommendation is to be used for a Voice over Long-Term Evolution (VoLTE) call between the first UE device and a second UE device. In some instances, the first UE device and the second UE device negotiate the rate to be used for the VoLTE call, based on the rate recommended by the base station. If the negotiated rate is supported by the base station and/or matches a supported codec rate, the UE devices implement the rate and provide rate feedback to the base station.

5 Claims, 5 Drawing Sheets

Related U.S. Application Data

(60) Provisional application No. 62/373,653, filed on Aug. 11, 2016.

(51) Int. Cl.
*H04W 28/22* (2009.01)
*H04L 69/24* (2022.01)

(56) References Cited

U.S. PATENT DOCUMENTS

| | | | |
|---|---|---|---|
| 9,210,564 B2* | 12/2015 | Yang | H04W 8/18 |
| 10,015,207 B2 | 7/2018 | Karimli et al. | |
| 11,252,612 B2* | 2/2022 | Chang | H04W 28/22 |
| 11,381,997 B2* | 7/2022 | Chang | H04W 28/22 |
| 11,736,983 B2* | 8/2023 | Chang | H04L 65/1069 |
| | | | 709/227 |
| 2006/0251093 A1 | 11/2006 | Curcio et al. | |
| 2006/0285497 A1 | 12/2006 | Miller et al. | |
| 2011/0141890 A1 | 6/2011 | Giaretta et al. | |
| 2012/0108520 A1 | 5/2012 | Ahn et al. | |
| 2014/0105041 A1 | 4/2014 | Swaminathan et al. | |
| 2015/0092575 A1 | 4/2015 | Khay-Ibbat et al. | |
| 2016/0157133 A1 | 6/2016 | Ehsan et al. | |
| 2016/0157136 A1 | 6/2016 | Hori et al. | |
| 2018/0103389 A1* | 4/2018 | Li | H04W 28/0215 |

OTHER PUBLICATIONS

CMCC; "Codec selection and adaptation solutions", R2-164317; 3GPP TSG-RAN WG2 Meeting #94, May 23-27, 2016; Nanjing, CN.

Huawei, Hisilicon; "RAN based codec adaptation mechanism", R2-162647; 3GPP TSG-RAN WG2 Meeting #93bis, Apr. 11-15, 2016; Dubrovnik, HR.

CMCC; "Study on enhancement of VoLTE", RP-160817; 3GPP TSG-RAN Meeting #72; Jun. 7, 2016; Busan, KR.

* cited by examiner

RAN-ASSISTED RATE ADAPTATION

CLAIM OF PRIORITY

The present application is a continuation of and claims priority to U.S. application Ser. No. 17/545,734, entitled "RAN-ASSISTED RATE ADAPTATION" and filed Dec. 8, 2021; which is a continuation of and claims priority to U.S. application Ser. No. 16/319,761, entitled "RAN-ASSISTED RATE ADAPTATION" and filed Jan. 22, 2019; which is a national stage application of PCT/US2017/046020, entitled "RAN-ASSISTED RATE ADAPTATION" and filed Aug. 9, 2017; which claims priority to Provisional Application No. 62/373,653, entitled "RAN-ASSISTED CODEC RATE ADAPTATION" and filed Aug. 11, 2016, all assigned to the assignee hereof and hereby expressly incorporated by reference in their entireties.

FIELD

This invention generally relates to wireless communications and more particularly to rate adaptation in a radio access network.

BACKGROUND

3rd Generation Partnership Project (3GPP) specified a new voice codec named EVS (Enhanced Voice Services). A codec is a device or program that (1) encodes data for transmission and/or storage, and (2) decodes received data for playback, storage, and/or editing. EVS provides high voice quality over a wide range of rates, which allows the low EVS codec rates to still have sufficient quality, and may be used in poor coverage environments and overload scenarios. However, it is still desirable to use the higher codec rates for enhanced audio quality whenever possible. EVS has the flexibility, with a wider rate range and full audio bandwidth, to deliver speech quality that matches other audio inputs, such as stored music, while offering high robustness to delay, jitter, and packet losses.

Radio conditions may also impact the codec mode and codec rate. For example, under poor radio conditions, a lower codec rate may be used to reduce the packet loss, whereas a higher codec rate can be used in good radio conditions to ensure a better user experience. Therefore, a flexible and efficient codec modification mechanism is needed that accounts for the voice codec, network capacity, radio conditions, and user experience.

SUMMARY

A base station transmits a rate recommendation to a first user equipment (UE) device. The rate recommendation is to be used for a Voice over Long-Term Evolution (VoLTE) call between the first UE device and a second UE device. In some instances, the first UE device and the second UE device negotiate the rate to be used for the VoLTE call, based on the rate recommended by the base station. If the negotiated rate is supported by the base station and/or matches a supported codec rate, the UE devices implement the rate and provide rate feedback to the base station.

DETAILED DESCRIPTION

Voice-over-LTE (VoLTE) is a key feature for the 3GPP Long Term Evolution (LTE) communication specification to provide voice service and is being deployed and launched by operators all over the world, which makes VoLTE capability extremely important for operators. One of the critical factors that may impact the user experience of VoLTE service is the voice codec configuration. For example, a higher Adaptive Multi-Rate (AMR) voice code rate may provide a higher-definition voice call and accordingly a better user experience. 2. When a higher AMR voice code rate is used, the higher codec rate requires more radio resource allocation, which implies less available network capacity.

The base station (e.g., eNB) of the Radio Access Network (RAN) is in the best position to trigger voice codec rate adaptation. Thus, an eNB-assisted (or RAN-assisted) codec rate adaptation solution should be considered. In order to support eNB-assisted codec rate adaptation, one of the main questions to consider is if the eNB needs to have the information on the specific codec rates for each type of supported codec. If we assume the eNB has specific information about the codec rates, we should also consider if the eNB would also need to know the codec type, the frame aggregation, the redundancy level, and the redundancy offset. This would imply the eNB could essentially serve as the end point for codec rate adaptation in place of the user equipment (UE) device.

However, if the eNB only has the codec rate information, it is unclear how much weight the UE should give to the eNB's recommended codec rate as one of the inputs to the UE's application layer. Note that traditionally eNBs do not handle any application layer signaling. Rather, they only handle the Access Stratum (AS) part of the LTE system. Adding application layer signaling within the eNB would drastically change the existing paradigm of how the network architecture is structured.

Figure 1:
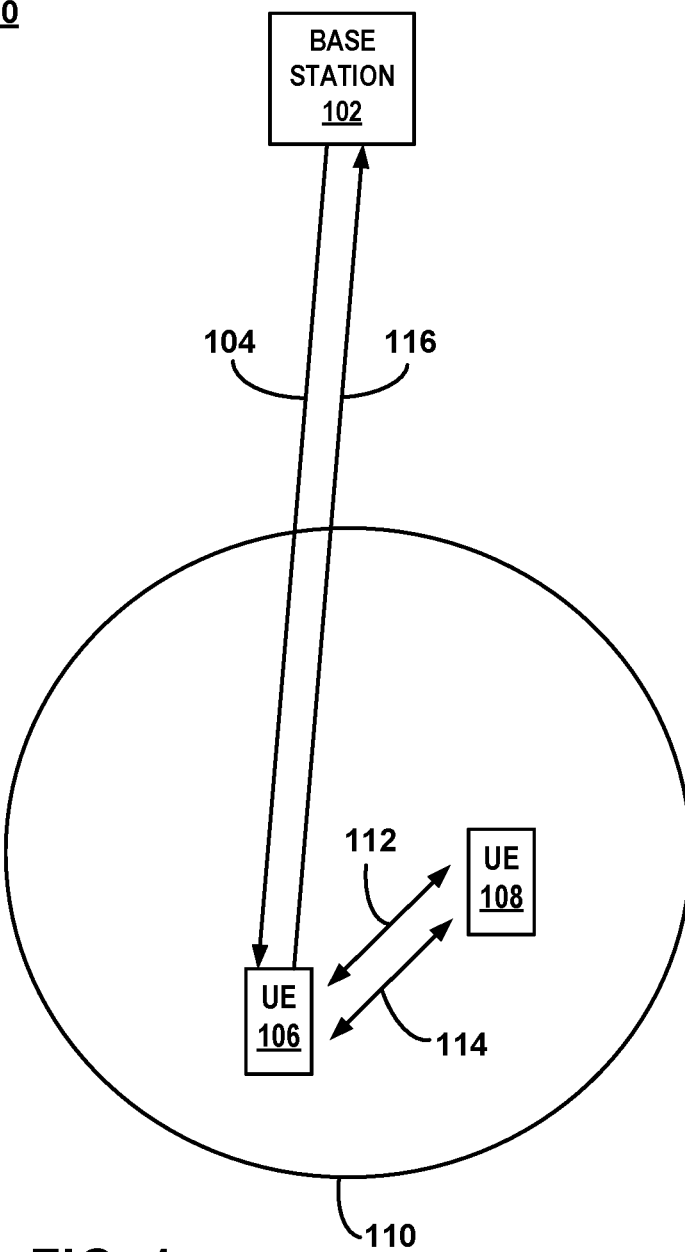
FIG. 1 is a block diagram of a communication system for an example in which a first user equipment (UE) device receives a rate recommendation to be used for a Voice over Long-Term Evolution (VoLTE) call with a second UE device.

FIG. 1 is a block diagram of a communication system for an example in which a first user equipment (UE) device receives a rate recommendation to be used for a Voice over Long-Term Evolution (VoLTE) call with a second UE device. The communication system 100 is part of a radio access network (not shown) that provides various wireless services to UE devices that are located within the respective service areas of the various base stations that are part of the radio access network. The base station 102 provides wireless services to UE devices 106, 108 via downlink signals 104.

In the interest of clarity and brevity, communication system 100 is shown as having a single base station 102, which provides wireless services to UE devices 106, 108, which are located within cell 110. However, in other examples, communication system 100 could have any suitable number of base stations. In the example of FIG. 1, cell 110 is represented by a circle, although a typical communication system 100 would have a plurality of cells having variously shaped geographical service areas. Base station 102, sometimes referred to as an eNodeB or eNB, communicates with the wireless user equipment (UE) devices 106, 108 by transmitting downlink signals 104 to the UE devices 106, 108 and receiving uplink signals 116 transmitted from the UE devices. Although downlink signals 104 and uplink signals 116 are only shown as being transmitted between base station 102 and UE device 106 for the example shown in FIG. 1, UE device 108 is also capable of receiving downlink signals 104 and transmitting uplink signals 116. The UE devices 106, 108 are any wireless communication devices such as mobile phones, transceiver modems, personal digital assistants (PDAs), and tablets, for example.

Figure 2A:
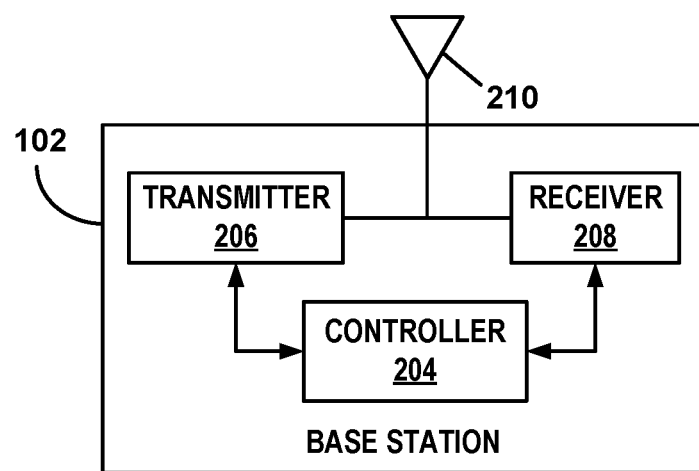
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 104 and can apply any one of a plurality of modulation orders. The demodulator demodulates any signals, including uplink signals 116, received at the base station 102 in accordance with one of a plurality of modulation orders.

Figure 2B:
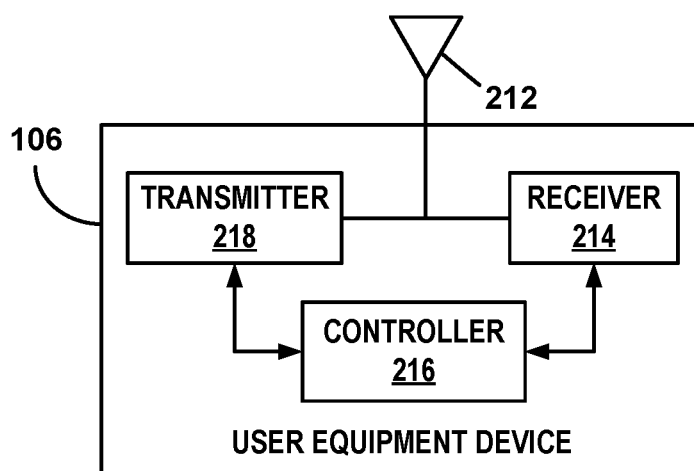
FIG. 2B is a block diagram of an example of the UE devices shown in FIG. 1.

Returning to FIG. 1, the communication system 100 provides various wireless services to the UE devices 106, 108 via base station 102. For the examples herein, the communication system 100 operates in accordance with at least one revision of the 3rd Generation Partnership Project Long Term Evolution (3GPP LTE) communication specification. A first UE device 106 receives downlink signal 104 via antenna 212 and receiver 214, as shown in FIG. 2B. Although FIG. 2B specifically depicts the circuitry and configuration of first UE device 106, the same UE device circuitry and configuration is utilized for second UE device 108. Besides antenna 212 and receiver 214, the first UE device 106 further comprises controller 216 and transmitter 218, as well as other electronics, hardware, and code. The first UE device 106 is any fixed, mobile, or portable equipment that performs the functions described herein. The various functions and operations of the blocks described with reference to the first UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals 116, which are shown in FIG. 1. The demodulator demodulates the downlink signal 104 in accordance with one of a plurality of modulation orders.

In operation, base station 102 transmits, via transmitter 206 and antenna 210, a rate recommendation to first user equipment (UE) device 106. First UE device 106 receives the rate recommendation via antenna 212 and receiver 214. The rate recommendation is a recommendation for a rate to be used for a Voice over Long-Term Evolution (VoLTE) call with second UE device 108. In some examples, the rate recommendation is a codec rate recommendation (e.g., a rate at which a voice codec encodes and decodes voice data for the VoLTE call). In other examples, the rate recommendation is a bit rate supported by the base station 102. In some situations in which the rate recommendation is a bit rate, the recommended bit rate is a maximum bit rate allowable by the base station 102. Regardless of the type of rate being recommended, the rate recommendation, in some examples, is a recommendation for a higher rate. In other examples, the rate recommendation is a recommendation for a lower rate. Moreover, any of these different types of rate recommendations may be broadcast by the base station 102, via transmitter 206 and antenna 210, to the UE devices 106, 108.

In some examples, the base station receives a rate change request, via antenna 210 and receiver 208, from the first UE device 106. The rate change request may be received before and/or after the base station 102 transmits the rate recommendation to the first UE device 106.

Moreover, the first UE device 106 and the second UE device 108 may negotiate a rate to be used for the VoLTE call 114. The first UE device 106 and the second UE device 108 use their respective transmitters 218, controllers 216, and antennas 212 to negotiate the rate via the application layer. The negotiation may take place before and/or after the base station 102 transmits the rate recommendation to first UE device 106.

Upon receipt of the rate recommendation, the controller 216 of first UE device 106 determines whether to (1) implement (e.g., accept) the recommended rate, (2) reject the recommended rate, (3) request a different rate than the recommended rate, (4) negotiate the rate with second UE device 108, or (5) perform any combination of two or more of the foregoing options.

Once the rate recommendation has been implemented (e.g., accepted), the first UE device 106 transmits a confirmation to the base station 102 indicating that the rate recommendation has been implemented. Base station 102 receives, via antenna 210 and receiver 208, the confirmation indicating that the rate recommendation has been implemented by the first UE device 106. In other examples in which the first UE device 106 requests a rate, base station 102 transmits a rate change recommendation, which serves as a confirmation, to the first UE device 106 indicating that the rate recommendation (e.g., requested rate) has been implemented (e.g., accepted). In these instances, first UE device 106 receives, via antenna 212 and receiver 214, the confirmation indicating that the rate has been implemented (e.g., accepted) by the base station 102.

Figure 3:
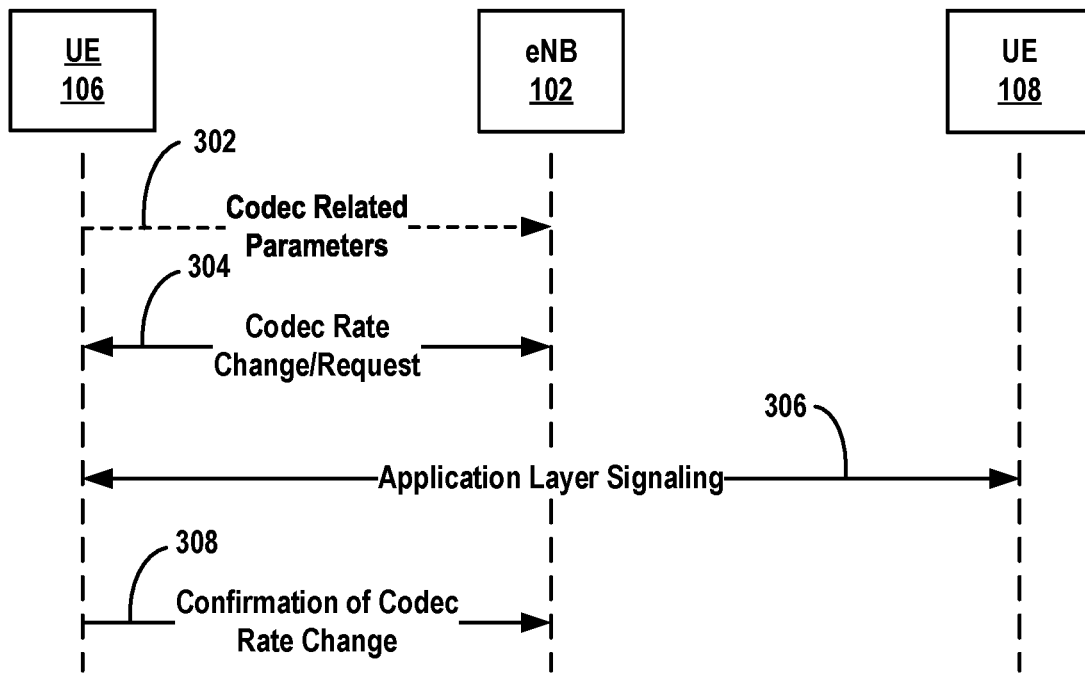
FIG. 3 is a messaging diagram of an example in which the base station has knowledge of codec rates and one or more additional codec rate related parameters.

FIG. 3 is a messaging diagram of an example in which the base station has knowledge of codec rates and one or more additional codec rate related parameters. In this example, the first UE device 106 provides, via signal 302, codec rate information, as well as one or more additional codec rate related parameters, to base station 102. For example, other codec rate related parameters could include the codec type, the frame aggregation, the redundancy level, and the redundancy offset. Of course, any other suitable codec rate related parameters may also be included. Regardless of the exact content of signal 302, signal 302 is sent, in this example, as an uplink signal 116 to base station 102.

Signal 304 can be either (1) a codec rate request sent by first UE device 106 to the base station 102, or (2) a codec rate change sent by the base station 102 to the first UE device 106. If signal 304 is a "codec rate request" sent by the first UE device 106, the first UE device 106 may send signal 304 in response to receiving a request to change codec rate from second UE device 108. However, if signal 304 is a "codec rate change" sent by the base station 102, the signal 304 can be sent as an application layer signal, which is not the conventional manner in which base stations currently communicate with UE devices in 3GPP LTE. However, such a configuration is possible if the base station 102 is modified to support application functionality.

Signal 306 represents application layer signaling between first UE device 106 and second UE device 108. In the example shown in FIG. 3, signal 306 is a negotiation between first UE device 106 and second UE device 108 in response to a "codec rate change" sent by the base station 102 via signal 304. Thus, in this instance, signal 306 is sent after signal 304. However, in other examples in which signal 304 is a "codec rate request" sent by the first UE device 106, signal 306 occurs before signal 304. Thus, in these cases, signal 306 is a negotiation between first UE device 106 and second UE device 108 to determine which codec rate should be requested from the base station 102 via signal 304. In yet further examples, signal 306 occurs both before and after signal 304.

First UE device 106 transmits signal 308 as an uplink signal 116 to base station 102. Signal 308 confirms the codec rate change was implemented (e.g., accepted) by first UE device 106.

Figure 4:
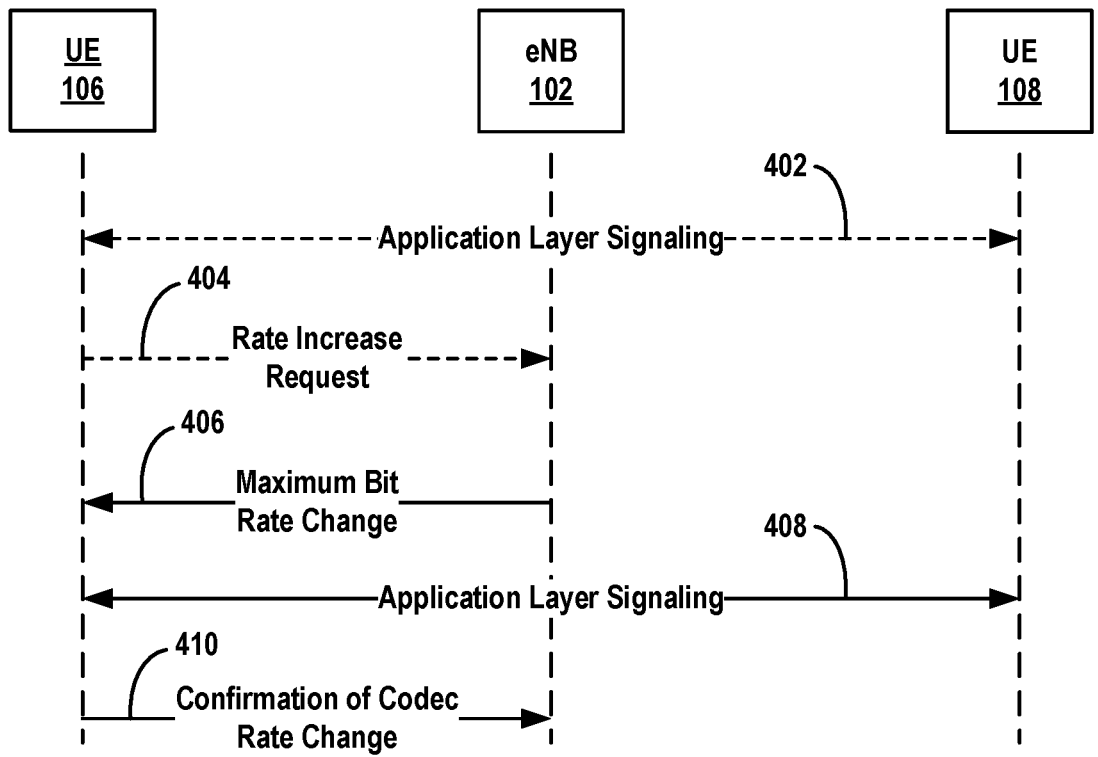
FIG. 4 is a messaging diagram of an example in which the base station has no knowledge of codec rates or any other codec rate related parameters.

FIG. 4 is a messaging diagram of an example in which the base station has no knowledge of codec rates or any other codec rate related parameters. In this example, the base station 102 recommends a supported bit rate for the communication link between the first UE device 106 and the base station 102, and the first UE device 106 responds with feedback of rate changes. In the example shown in FIG. 4, second UE device 108 initiates a codec rate negotiation. Signal 402 represents application layer signaling between first UE device 106 and second UE device 108, over which the codec rate negotiation is conducted. If the codec rate negotiation yields a determination that a higher rate should be requested, first UE device 106 transmits a rate increase request via signal 404. However, signals 402, 404 are omitted in scenarios in which the UE devices are not requesting a rate increase.

Base station 102 transmits signal 406, which contains the maximum bit rate change (e.g., for an increase or a decrease) that is supported by the base station 102. A rate increase signal 406 may be transmitted in response to a rate increase request 404. In other examples, the base station 102 may transmit a rate decrease signal 406 when the base station 102 is experiencing a radio congestion scenario.

Signal 408 represents application layer signaling between first UE device 106 and second UE device 108 to determine if the rate change recommended by the base station can be successfully negotiated between the UE devices. First UE device 106 transmits signal 410 as an uplink signal 116 to base station 102. Signal 410 confirms whether the rate change was successfully negotiated between the UE devices 106, 108. The confirmation signal 410 may or may not include the actual codec rate that was implemented (e.g., accepted).

Figure 5:
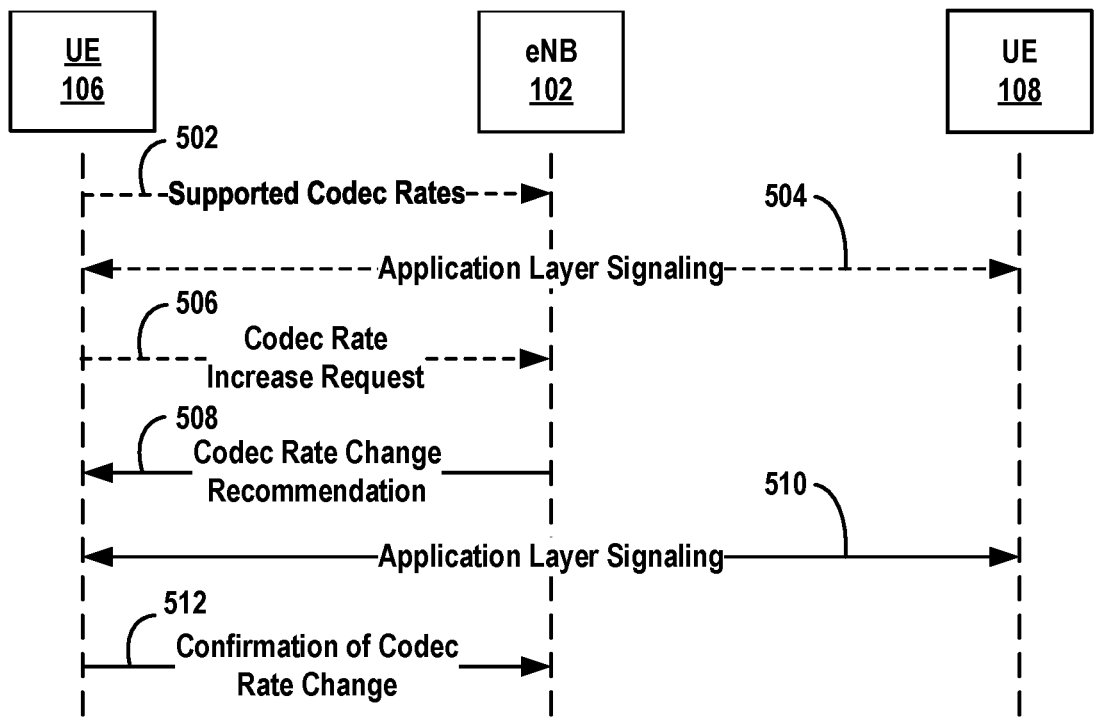
FIG. 5 is a messaging diagram of an example in which the base station has knowledge of codec rates but does not have knowledge of any other codec rate related parameters.

FIG. 5 is a messaging diagram of an example in which the base station has knowledge of codec rates but does not have knowledge of any other codec rate related parameters. First UE device 106 provides the supported codec rates to base station 102, via signal 502. In the example shown in FIG. 5, second UE device 108 initiates a codec rate negotiation. Signal 504 represents application layer signaling between first UE device 106 and second UE device 108, over which the codec rate negotiation is conducted. If the codec rate negotiation yields a determination that a higher rate should be requested, first UE device 106 transmits a codec rate increase request via signal 506. However, signals 504, 506 are omitted in scenarios in which the UE devices are not requesting a rate increase.

Base station 102 transmits signal 508, which contains a recommendation for a codec rate change (e.g., for an increase or a decrease). In some cases, signal 508 contains a recommendation for a specific codec rate, but in other cases, signal 508 can be configured to merely recommend an increase or a decrease in codec rate. A codec rate increase signal 508 may be transmitted in response to a codec rate increase request 506. In other examples, the base station 102 may transmit a codec rate decrease signal 508 when the base station 102 is experiencing a radio congestion scenario.

Signal 510 represents application layer signaling between first UE device 106 and second UE device 108 to determine if the codec rate change recommended by the base station 102 can be successfully negotiated between the UE devices. First UE device 106 transmits signal 512 as an uplink signal 116 to base station 102. Signal 512 confirms whether the codec rate change was successfully negotiated between the UE devices 106, 108. In the examples in which signal 508 is configured to signal an increase or decrease in codec rate, signal 512 can be configured to inform base station 102 of the amount of increase or decrease in the codec rate so that base station 102 can provide sufficient radio resources for the revised codec rate. If base station 102 cannot support the new codec rate change, then base station 102 has the option to signal 508 again in the opposite direction or to provide a specific codec rate instead.

Figure 6:
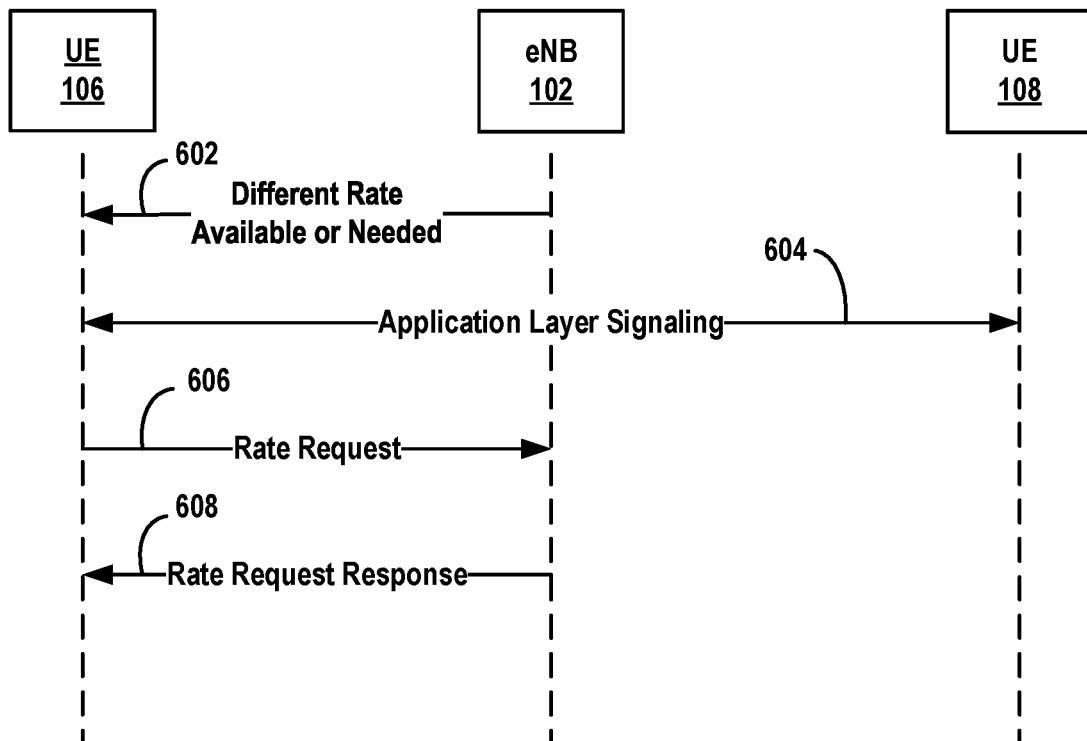
FIG. 6 is a messaging diagram of an example in which the base station receives a request for a specific codec rate and either accepts or rejects the requested codec rate.

FIG. 6 is a messaging diagram of an example in which the base station 102 informs the first UE device 106 that a higher or lower rate may be supported. The first UE device 106 responds with a preferred rate, which may correspond to a codec rate. The base station 102 either accepts or rejects the requested rate.

For example, base station 102 transmits signal 602, which informs first UE device 106 that a higher rate is available or that a lower rate is needed. A higher rate available signal 602 may be transmitted in response to a rate increase request from one or more of the UE devices. In other examples, the base station 102 may transmit a lower rate needed signal 602 when the base station 102 is experiencing a radio congestion scenario.

Signal 604 represents application layer signaling between first UE device 106 and second UE device 108 to determine if the rate change recommended by the base station 102 can be successfully negotiated between the UE devices. First UE device 106 transmits signal 606 as an uplink signal 116 to base station 102. Signal 606 contains a request for a specific rate, which may be a result of the negotiation between the UE devices 106, 108. Base station 102 replies with rate request response signal 608, which confirms whether the base station can implement (e.g., accept) the rate requested via signal 606.

Figure 7:
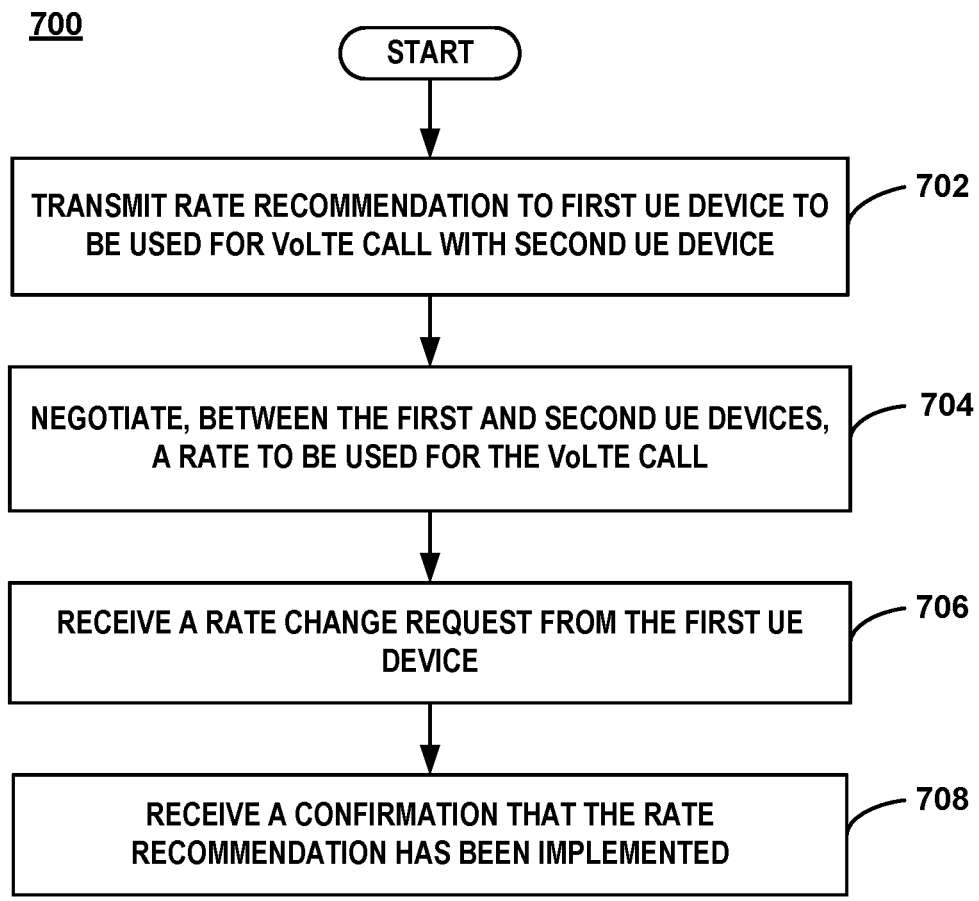
FIG. 7 is a flowchart of an example of a method in which a first UE device receives a rate recommendation to be used for a Voice over Long-Term Evolution (VoLTE) call with a second UE device.

FIG. 7 is a flowchart of an example of a method in which a first UE device receives a rate recommendation to be used for a Voice over Long-Term Evolution (VoLTE) call with a second UE device. The method 700 begins at step 702, in which base station 102 transmits a rate recommendation to first UE device 106 to be used for a VoLTE call with second UE device 108. At step 704, first UE device 106 and second UE device 108 negotiate a rate to be used for the VoLTE call. As mentioned above, the rate negotiation represented by step 704 can be performed before step 702, after step 702, or both. At step 706, the base station 102 receives a rate change request from the first UE device 106. In some examples, the requested rate change is determined based on the rate negotiations between the first UE device 106 and the second UE device 108. At step 708, a confirmation is received that the rate recommendation has been implemented (e.g., accepted). In some examples, the base station 102 receives the confirmation. In other examples, the first UE device 106 receives the confirmation from the base station 102.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A base station comprising:
   a receiver configured to receive, from a first user equipment (UE) device, a message to check if a first bit rate can be provided by the base station, the message transmitted in response to the first bit rate exceeding a second bit rate currently supported by the first UE device, the first bit rate being requested by a second UE device to be used in a voice packet communication with the first UE device;
   a transmitter configured to transmit a bit rate recommendation to the first UE device in response to receiving the message; and
   a controller configured to execute the functions of the receiver and the transmitter.

2. The base station according to claim 1, wherein the message indicates a request for increasing of a bit rate used in the voice packet communication.

3. A method for a base station comprising:
   receiving from a first user equipment (UE) device, a message to check if a first bit rate can be provided by the base station, the message transmitted in response to the first bit rate exceeding a second bit rate currently supported by the first UE device, the first bit rate being requested by a second UE device to be used in a voice packet communication with the first UE device; and
   transmitting the bit rate recommendation to the first UE device in response to receiving the message.

4. The method according to claim 3, wherein
the message indicates a request for increasing a bit rate used in the voice packet communication.

5. A system comprising: a first user equipment (UE) device; a second UE device; and a base station, wherein the first UE device comprises:
- a receiver configured to receive, from the second UE device, information indicating a first bit rate requested by the second UE device to be used in a voice packet communication with the first UE device; and
- a transmitter configured to transmit a message to the base station in response to the first bit rate exceeding a second bit rate currently supported by the first UE device; and
- a controller configured to execute the functions of the receiver and the transmitter, the message to check if the first bit rate can be provided by the base station, wherein
- the receiver is further configured to receive the bit rate recommendation from the base station.

* * * * *